United States Patent
Yuan et al.

(10) Patent No.: US 10,917,318 B2
(45) Date of Patent: Feb. 9, 2021

(54) PACKET CAPTURE VIA PACKET TAGGING

(71) Applicant: Microsoft Technology Licensing, LLC, Redmond, WA (US)

(72) Inventors: Lihua Yuan, Redmond, WA (US); Xinyan Zan, Sammamish, WA (US); Deepak Bansal, Yarrow Point, WA (US); David A. Maltz, Redmond, WA (US); Leiwen Deng, Redmond, WA (US); Sheng Lu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 158 days.

(21) Appl. No.: 16/138,891

(22) Filed: Sep. 21, 2018

(65) Prior Publication Data
US 2020/0099599 A1 Mar. 26, 2020

(51) Int. Cl.
*H04L 12/26* (2006.01)
*G06F 9/455* (2018.01)
*H04L 12/46* (2006.01)
*H04L 29/06* (2006.01)

(52) U.S. Cl.
CPC .......... *H04L 43/04* (2013.01); *G06F 9/45558* (2013.01); *H04L 12/4645* (2013.01); *H04L 69/22* (2013.01); *G06F 2009/45595* (2013.01)

(58) Field of Classification Search
CPC ..... H04L 43/04; H04L 12/4645; H04L 69/22; H04L 43/12; G06F 9/45558; G06F 2009/45595
See application file for complete search history.

(56) References Cited

U.S. PATENT DOCUMENTS

| | | | |
|---|---|---|---|
| 2012/0155511 A1* | 6/2012 | Shaffer | H04B 1/713 375/133 |
| 2015/0016286 A1* | 1/2015 | Ganichev | H04L 45/42 370/252 |
| 2017/0208077 A1* | 7/2017 | Freedman | H04L 43/04 |
| 2017/0250907 A1* | 8/2017 | Pignataro | H04L 43/10 |
| 2017/0251065 A1 | 8/2017 | Furr et al. | |
| 2018/0041524 A1* | 2/2018 | Reddy | H04L 63/1408 |

FOREIGN PATENT DOCUMENTS

WO 2017122166 A1 7/2017
WO 2018046988 A1 3/2018

OTHER PUBLICATIONS

"International Search Report and Written Opinion Issued in PCT Application No. PCT/US2019/039103", dated Sep. 16, 2019, 12 Pages.

* cited by examiner

Primary Examiner — Kim T Nguyen
(74) Attorney, Agent, or Firm — Newport IP, LLC; Han Gim (57) ABSTRACT

Techniques are disclosed for capturing network traffic in a virtualized computing environment. A packet to be captured in the virtualized environment is identified. The packet is tagged using a pattern of one or more bits in a header of the packet. The pattern indicates that the packet is to be traced. The pattern is propagated to an outer layer during encapsulation of the packet. A header of the encapsulated packet includes the pattern of one or more bits. At least one network device is caused to mirror identified packets based on the reserved bit.

20 Claims, 8 Drawing Sheets

PACKET CAPTURE VIA PACKET TAGGING

BACKGROUND

A data center is a facility that houses computer systems and various networking, storage, and other related components. Data centers may, for example, provide computing services to businesses and individuals as a remote computing service or provide "software as a service" (e.g., cloud computing).

To facilitate efficient utilization of data center resources, virtualization technologies allow a physical computing device to host one or more virtual machines ("VM") that appear and operate as independent computer devices to a connected user. The data center can create, maintain or delete virtual machines in a dynamic manner.

When the data center experiences network connectivity issues, poor network performance may result, resulting in lost data, or users being unable to provide quality services to their downstream customers, which may result in lost revenue and customer dissatisfaction. Troubleshooting network connectivity issues may be difficult to perform given the complexity of the networks in data centers. It is with respect to these considerations and others that the disclosure made herein is presented.

SUMMARY

The disclosed embodiments describe technologies for data centers to quickly and easily diagnose network connectivity issues, particularly intermittent drops that may lead to poor network performance in the data center. This may allow data centers to more effectively adhere to operational objectives and at the same time improve operating efficiencies.

End-to-end network diagnostics in a datacenter can be difficult and costly. There may be multiple routers/switches and end hosts involved, and it may be difficult to diagnose where and if any packet loss is occurring. With the complex topologies that are commonly implemented in data centers, such as a Clos topology, there are multiple network paths and a number of devices/hops involved in any network communication. Any device/hop may drop packets intermittently. Attempts to find the intermittent device/interface may involve performing packet capture hop by hop, or by turning links off one by one to isolate the offending device. For example, an administrator may have to enable packet capture hop by hop on each of the switches and then correlate the captured traffic from different hops. Enabling packet capture hop by hop can be time consuming and may require that the operator have knowledge of the path that the traffic will take. Additionally, packet drop counters may not be targeted for any particular traffic of interest. Troubleshooting such issues can be time consuming, error prone, and risky. It can also be labor-intensive as the network operator may need to access each and every device and enable packet capture. The packet drop counters on router/switches are typically not specific enough for a given flow, thus not allowing for the identification of the source of the issue if the issue does not have a broad impact and only impacts a subset of a dataflow. Tools such as Netscan and Netbouncer may generally provide a way to detect lossy links or devices. However, such tools do not target specific customer traffic that may be experiencing issues. Furthermore, such tools are out of band rather than in band.

In various embodiments, methods and systems are disclosed for tagging packets at end hosts and entry points at the edge of a network. Packet capture on tagged packets may then be enabled on some or all devices in the data center. Devices on the data path may then automatically capture packets for any traffic that is tagged. Furthermore, devices can report packet counters for tagged packets and hence can be used to quickly locate packet drops.

In some embodiments, packets may be marked for a specific user, virtual machine, data flow, or any other issue or item of interest that is to be diagnosed for network connectivity issues. In one embodiment, a reserved header field such as the DSCP field of the IP header may be used to tag packets.

In some embodiments, a mechanism may be utilized on the routers and switches as well as any intermediate virtualized network components and end hosts such as the load balancer to capture traffic that is tagged. Additionally, a mechanism may be utilized on the routers and switches as well as virtualized network components and end hosts to count tagged packets and report data loss based on incoming tagged packets vs. outgoing tagged packets.

In some embodiments, an application programming interface (API) may be implemented to enable tagging at a per user/VM/flow level. In some embodiments, tagging may be performed at the host so that a data center administrator can control and use the mechanism operationally. Alternatively, the virtual machine may be allowed to tag packets and the host may perform throttling as needed.

In one embodiment, the following components may be implemented:

In the host component, an agent may be implemented on the host that is configured to receive a goal state from the controller specifying flow (e.g., specifying the 5-tuple) and virtual machine information for the packets that need to be tagged. The host agent may further configure rules in virtualized and other network components in the data path to perform the tagging and to enable packet capture on the host.

In the network controller, an API may be implemented that is configured to specify packet capture on a per user or per virtual or per flow level basis. The network controller may be configured to translate this information into rules for each of the hosts that are hosting virtual machines for that user.

In the switches/routers and other network devices, pre-configuration may be performed to capture all traffic marked with the specified tag and to forward this traffic to a collector function. Additionally, packet counters may be configured based on incoming and outgoing tagged packets.

A collector or collector function may be implemented that is configured to collect all tagged packets and counters for analysis. In some embodiments, tags may be stripped off at the receiving host or at the edge of the network.

By providing such a mechanism for diagnosing network connectivity issues, reduction or loss of services provided by service providers may be avoid or mitigated, reducing downtime and impact to end users and providing for greater operational efficiency for service providers such as operators of virtual machines.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The following Detailed Description describes technologies for diagnosing network connectivity issues in data centers, including those that provide virtualized services. In such networks it may be difficult to capture information to troubleshoot and identify network issues, in particular capturing packets that are being transmitted in the physical network. Such networks may comprise many network devices such as switches and other network devices. In order to capture data traffic to perform fault detection and isolation, a rule or a set of instructions should be specified to match the outermost IP headers in order to capture the desired data traffic. However, many switches are specialized and are differently configured, and the rules or instructions may need to be specific to each switch. Furthermore, the administrator must know what the IP header looks like in order to filter for any particular packet. In a virtualized environment, the layers of virtualization can obscure the details of the data and the outer headers of the physical network. It is thus difficult to identify individual user streams, since user streams may be aggregated into one stream. Therefore, in order to capture a particular user stream, even if the outer header is known, it may not be possible to differentiate individual user streams because the different user streams may share the same outer IP address.

In some cases, mirroring techniques, where a copy of packets are sent to a network monitoring device, may increase network traffic which may cause performance issues. Furthermore, the effort to analyze and review the mirrored traffic can be significant as the volume of mirrored traffic increases.

Described herein are methods and systems for capturing network traffic to facilitate diagnosis of network connectivity issues by packet tagging. In various embodiments, packets that are to be captured are tagged. Packet capture on the tagged packets are then enabled on some or all network devices in the datacenter. Devices on the data path may automatically capture tagged packets. In this way, tagged packets to be captured in a way that provides a number of technical improvements and efficiencies. The improvements and efficiencies provide for greater usability, allowing for desired network traffic to be easily identified in spite of data aggregation and network packet layering. The improvements and efficiencies allow for service providers to analyze network issues while maintaining network performance by reducing the volume of mirrored packets, especially in networks where switches are employed which typically do not have local storage to allow for local capture and storage. The disclosed techniques may be implemented in any type of networked environment, including those that provide virtualized computing and network resources.

In one embodiment, the network control plane can be configured to allow an administrator to specify a desired user flow for tracking and implement tagging. The tagging can be implemented so that network switches can be configured to look for one or more bits in a packet and mirror only those packets.

In some embodiments, a reserved bit in the IP header may be used to tag packets. In one embodiment, one or more bits in the DSCP field in the IP header may be used for tagging packets. In at least one embodiment, the 2nd MSB (value of 16) may be used to identify (tag) packets that are to be mirrored. By setting a reserved bit in this manner, network switches can be configured to use pattern matching to quickly identify tagged packets.

In an embodiment, the 5-tuple may be used to identify the desired packet(s). The 5-tuple may include the source IP address and port number, and the destination IP address/port number. The desired packets may then be identified by setting a DSCP bit that may be used to inform switches of which packet to mirror. As a tagged packet is encapsulated, the DSCP value may be carried through from the inner packets to the outer packets, ensuring that the DSCP value is visible to the network switches.

Figure 1:
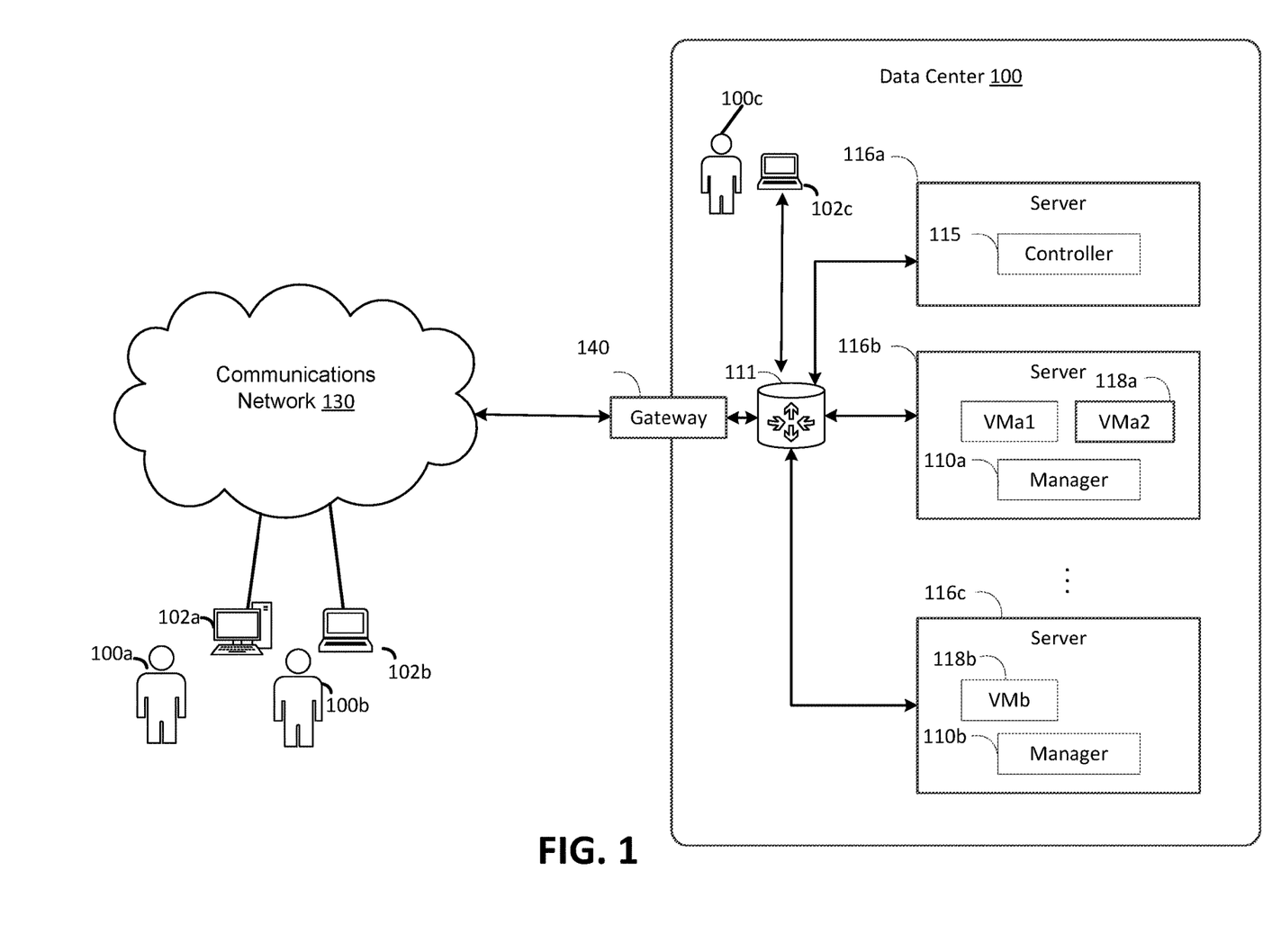
FIG. 1 is a diagram illustrating a data center in accordance with the present disclosure.

FIG. 1 illustrates an example computing environment in which the embodiments described herein may be implemented. FIG. 1 illustrates a data center 100 that is configured to provide computing resources to users 100a, 100b, or 100c (which may be referred herein singularly as "a user 100" or in the plural as "the users 100") via user computers 102a, 102b, and 102c (which may be referred herein singularly as "a computer 102" or in the plural as "the computers 102") via a communications network 130. The computing resources provided by the data center 100 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 100 may include servers 116a, 116b, and 116c (which may be referred to herein singularly as "a server 116" or in the plural as "the servers 116") that provide computing resources available as virtual machines 118a and 118b (which may be referred to herein singularly as "a virtual machine 118" or in the plural as "the virtual machines 118"). The virtual machines 118 may be configured to execute applications such as Web servers, application servers, media servers, database servers, and the like. Other resources that may be provided include data storage resources (not shown on FIG. 1) and may include file storage devices, block storage devices, and the like. Servers 116 may also execute functions that manage and control allocation of resources in the data center, such as a controller 115. Controller 115 may be a fabric controller or another type of program configured to manage the allocation of virtual machines on servers 116.

Referring to FIG. 1, communications network 130 may, for example, be a publicly accessible network of linked networks and may be operated by various entities, such as the Internet. In other embodiments, communications network 130 may be a private network, such as a corporate network that is wholly or partially inaccessible to the public.

Communications network 130 may provide access to computers 102. Computers 102 may be computers utilized by users 100. Computer 102a, 102b or 102c may be a server, a desktop or laptop personal computer, a tablet computer, a smartphone, a set-top box, or any other computing device capable of accessing data center 100. User computer 102a or 102b may connect directly to the Internet (e.g., via a cable modem). User computer 102c may be internal to the data center 100 and may connect directly to the resources in the data center 100 via internal networks. Although only three user computers 102a, 102b, and 102c are depicted, it should be appreciated that there may be multiple user computers.

Computers 102 may also be utilized to configure aspects of the computing resources provided by data center 100. For example, data center 100 may provide a Web interface through which aspects of its operation may be configured through the use of a Web browser application program executing on user computer 102. Alternatively, a stand-alone application program executing on user computer 102 may be used to access an application programming interface (API) exposed by data center 100 for performing the configuration operations.

Servers 116 may be configured to provide the computing resources described above. One or more of the servers 116 may be configured to execute a manager 120a or 120b (which may be referred herein singularly as "a manager 120" or in the plural as "the managers 120") configured to execute the virtual machines. The managers 120 may be a virtual machine monitor (VMM), fabric controller, or another type of program configured to enable the execution of virtual machines 118 on servers 116, for example.

It should be appreciated that although the embodiments disclosed above are discussed in the context of virtual machines, other types of implementations can be utilized with the concepts and technologies disclosed herein.

In the example data center 100 shown in FIG. 1, a network device 111 may be utilized to interconnect the servers 116a and 116b. Network device 111 may comprise one or more switches, routers, or other network devices. Network device 111 may also be connected to gateway 140, which is connected to communications network 130. Network device 111 may facilitate communications within networks in data center 100, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 1 has been greatly simplified and that many more networks and networking devices may be utilized to interconnect the various computing systems disclosed herein. These network topologies and devices should be apparent to those skilled in the art.

It should also be appreciated that data center 100 described in FIG. 1 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 2:
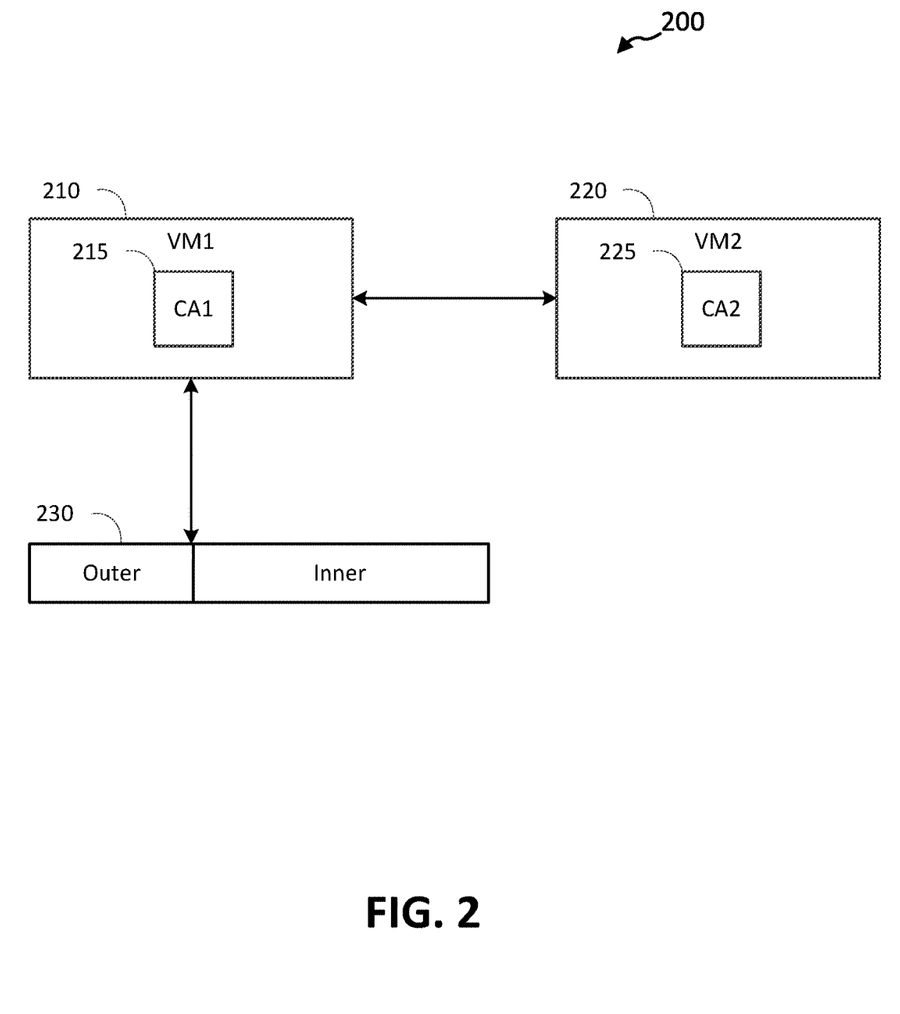
FIG. 2 is a diagram illustrating further details of a data center in accordance with the present disclosure.

FIG. 2 illustrates an example virtualized environment 200 that includes a first virtual machine 210 and a second virtual machine 220. The first virtual machine 210 may be associated with a first customer address 215, and the second virtual machine 220 may be associated with a second customer address 225. The first customer address 215 and the second customer address 225 may be known and used by the customers or users of the first virtual machine 210 and the second virtual machine 220. However, when data is sent over the network, the virtualized environment 200 may encapsulate data packets which may specify customer-known address with those that may be used by the virtualized environment 200. As shown in FIG. 2, data packet 230 shows an inner packet that may include customer specific destination and source addresses, which may be encapsulated with an outer header that specifies source and destination addresses that are implemented by the virtualized environment 200 but may not be known by the customers of the first virtual machine 210 and the second virtual machine 220. One or more additional headers may be added to the original packet, or some headers might be translated or altered. The additions and changes in the headers would normally make it difficult to capture all packets associated with a VM, customer, or flow. to the described embodiments enable capturing of the desired packets in one or more places in the network even in the presence of the additional or changed headers.

Figure 3:
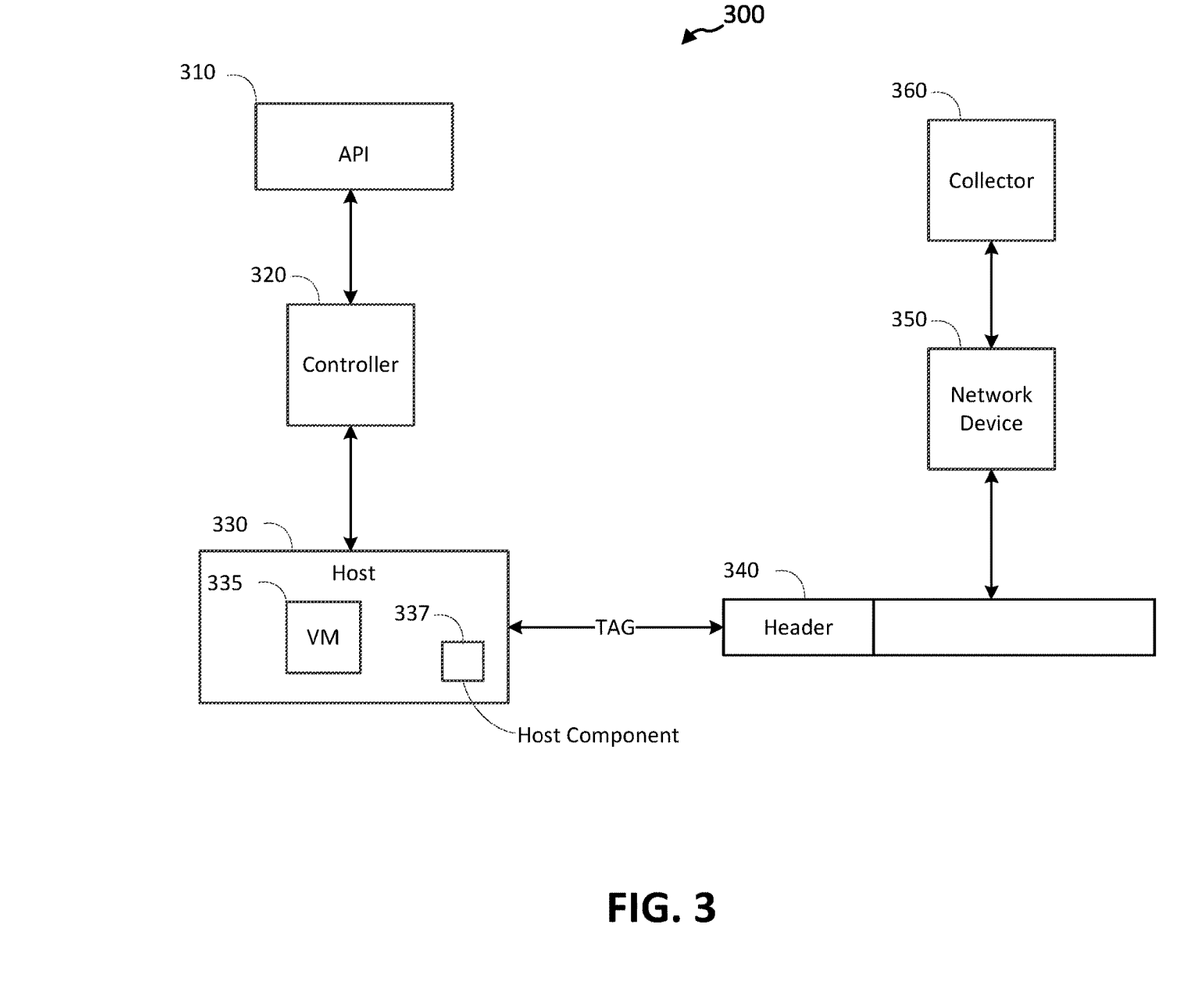
FIG. 3 is a diagram illustrating diagnosing network issues in accordance with the present disclosure.

FIG. 3 illustrates an example virtualized environment 300 that includes an API 310 that is configured to receive requests for data that is to be captured. The API 310 may be exposed by a network controller 320. The API may be configured to allow users to specify which packets to capture. For example, the packets may be specified on a per customer basis, per VM basis, or per flow level. The network controller 320 may be configured to translate API requests into rules for each of the hosts which are hosting VMs for that customer. FIG. 3 also illustrates a host component or agent 337 running on a host 330 running virtual machine 335 that is configured to receive a goal state from the controller 320 that specifies flow (e.g., a 5-tuple) and virtual machine information for packets 340 that need to be tagged. The host component may be configured to determine rules in the data path to perform the tagging and to also enable packet capture on the host 330. Packets 340 may include a header. In some embodiments, a reserved bit in the IP header may be used to tag packets. In one embodiment, one or more reserved bits in the IP header may be used for tagging packets. In at least one embodiment, the DSCP field in the IP header (e.g., the 2nd MSB) may be used to identify (tag) packets that are to be mirrored. A network switch 350 or other network device may be configured to use pattern matching to identify tagged packets. In some embodiments, network switch 350 may mirror tagged packets, and collector 360 may be configured to collect tagged packets and implement counters. In some embodiments, to prevent a device from getting overloaded, either the device, controller 320, or other component may throttle how many packets will be accepted for tagging. The collector may be configured to analyze the collected packets and other information to determine network issues and/or identify causes of network issues. The collector may also provide the information to other services for analysis and resolution. For example, the collector or other function can utilize data about a flow from multiple devices to determine an end-to-end path and other information such as where a packet was dropped.

Figure 4:
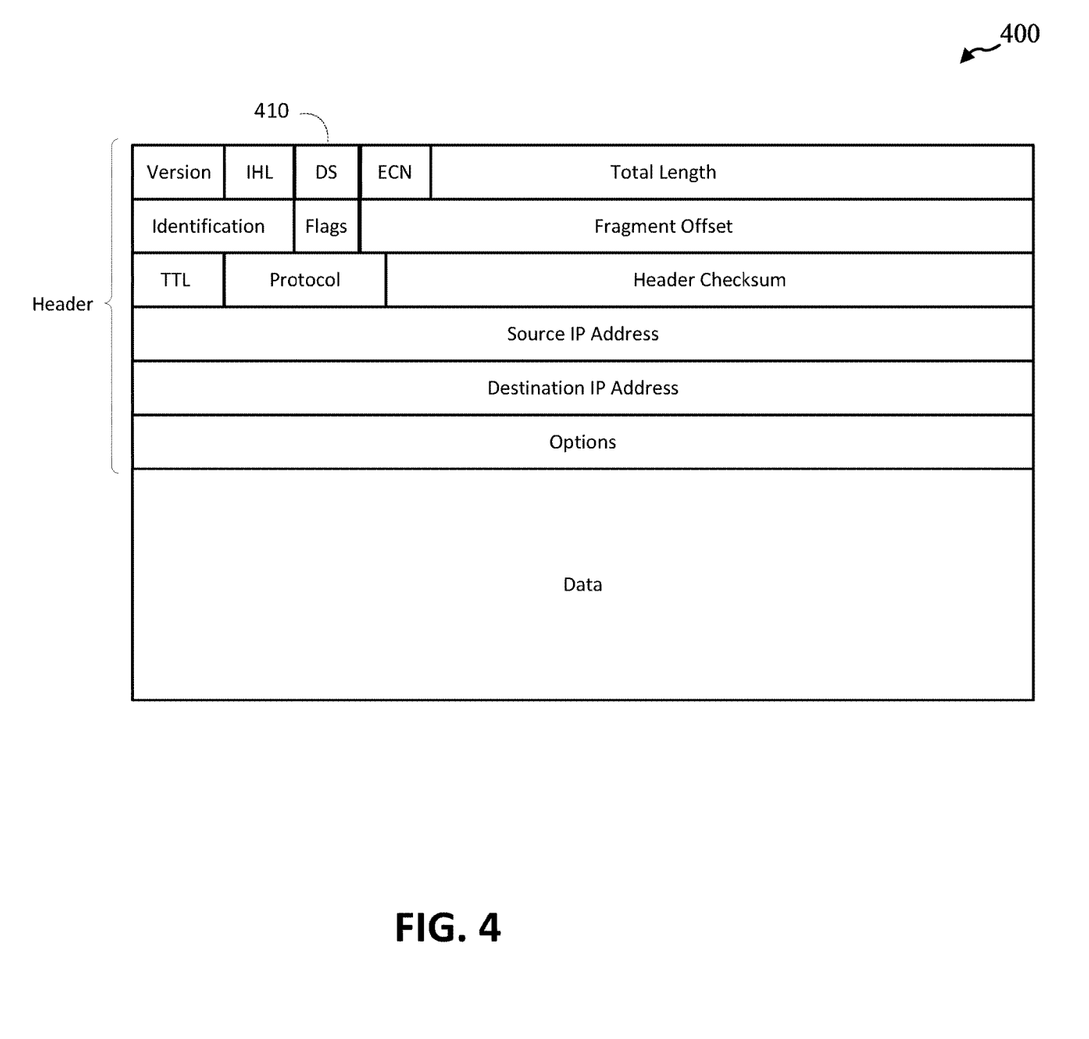
FIG. 4 is a diagram illustrating an example IP header.
Figure 5:
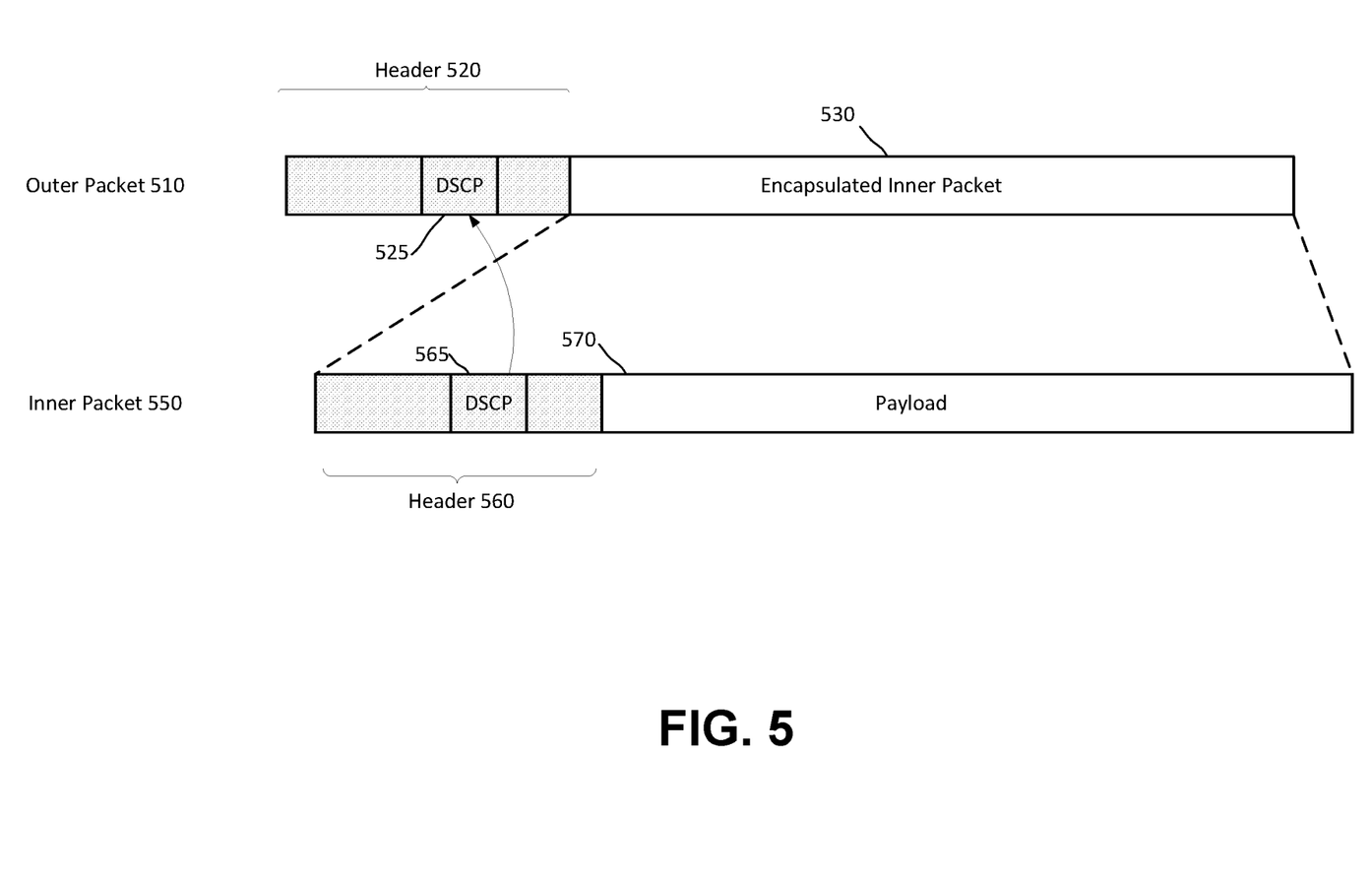
FIG. 5 is a diagram illustrating an example of tag propagation in accordance with the present disclosure.

FIG. 4 illustrates an example IP header with DS field 410 that comprises 6 bits of the Differentiated Services Code Point (DSCP) field. Turning to FIG. 5, illustrated is an example of propagating the bits that are using to indicate tagging that may be implemented in the DSCP field as packets are encapsulated. Inner packet 550 may include a payload 570 and header 560 that includes DSCP field 565 that, in some embodiments, has set the second MSB to indicate that the packet should be captured/mirrored. The inner packet 550 may be encapsulated as payload 530 of outer packet 510. Outer packet 510 may include a header 520 with DSCP field 525 that has propagated the DSCP field 565 of inner packet 550. DSCP field 525 thus has also set the second MSB to indicate that the packet should be mirrored. In an alternate embodiment, one or more bits in the IP Identifier field might be used. The value in IP Identifier field is typically set to a random number. In some embodiments, one or more bits in the IP Identifier field may be used to capture some fraction of all the packets flowing through the network. For example, if all packets with the bit pattern 001 in the least significant bits are captured, then on average $\frac{1}{16}^{th}$ of IP packets in the network will be captured.

Figure 6:
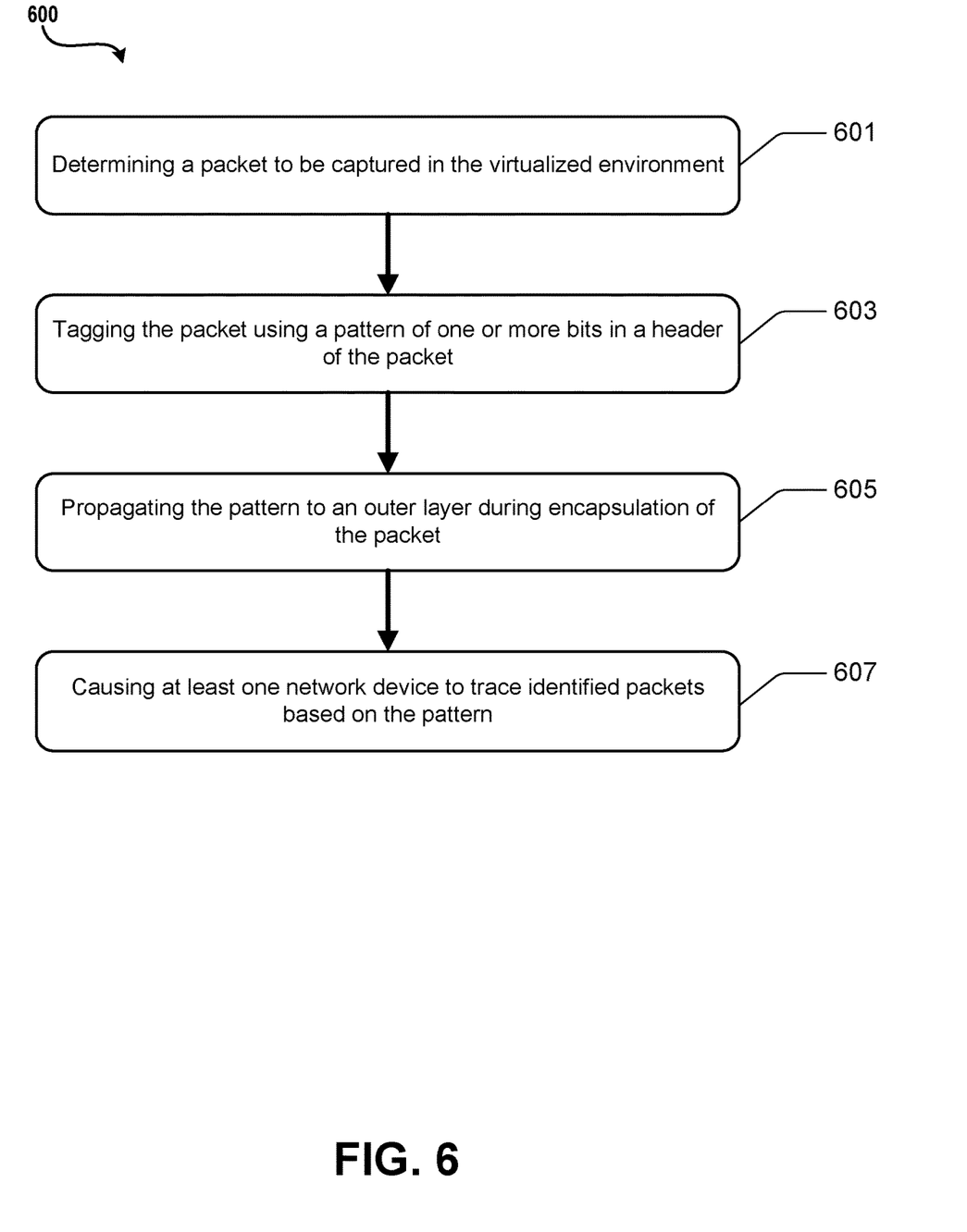
FIG. 6 is a flowchart depicting an example procedure for diagnosing network issues in accordance with the present disclosure.

Turning now to FIG. 6, illustrated is an example operational procedure for capturing network traffic in a virtualized computing environment in accordance with the present disclosure. Such an operational procedure may provide for capturing network traffic and can be provided by services such as the controller 320 and host component 337 in FIG. 3. The operational procedure may be implemented in a system comprising one or more computing devices. Referring to FIG. 6, operation 601 illustrates determining a packet to be captured in the virtualized environment. In an embodiment, the packet to be captured is specified using an associated 5-tuple. Additionally, the packet to be captured may be specified using an associated 5-tuple and a user or customer identifier. In one embodiment, the packet to be captured may be based on a source virtual machine. In one embodiment, the packet to be captured may be translated to a packet with one or more additional or removed headers.

Operation 601 may be followed by operation 603. Operation 603 illustrates tagging the packet using a pattern of one or more bits in a header of the packet. In an embodiment, the pattern indicates that the packet is to be traced. In an embodiment, the pattern indicates that the packet is to be traced. In an embodiment, the pattern may be a bit in a DSCP header. In another embodiment, the pattern of bits comprises a bit in a IP identifier field. In some embodiments, the reserved bit may be the second most significant bit in the DSCP header. In an embodiment, packets may be tagged at end hosts and entry points at an edge of a virtualized network.

Operation 603 may be followed by operation 605. Operation 605 illustrates propagating the reserved bit to an outer layer during encapsulation of the packet. In an embodiment, a header of the encapsulated packet includes the pattern of one or more bits. In an embodiment, markings that indicate that the packet is to be mirrored are propagated to the outer header.

Operation 605 may be followed by operation 607. Operation 607 illustrates causing at least one network device to trace identified packets based on the pattern in the header of the encapsulated packet. In an embodiment, the network device may be a switch configured to filter packets based on the reserved bit. Tracing a packet may include one or more of mirroring the packet, recording a number of counts for the packet, storing the packet, or otherwise recording the occurrence of identifying the packet for analysis and troubleshooting.

Figure 7:
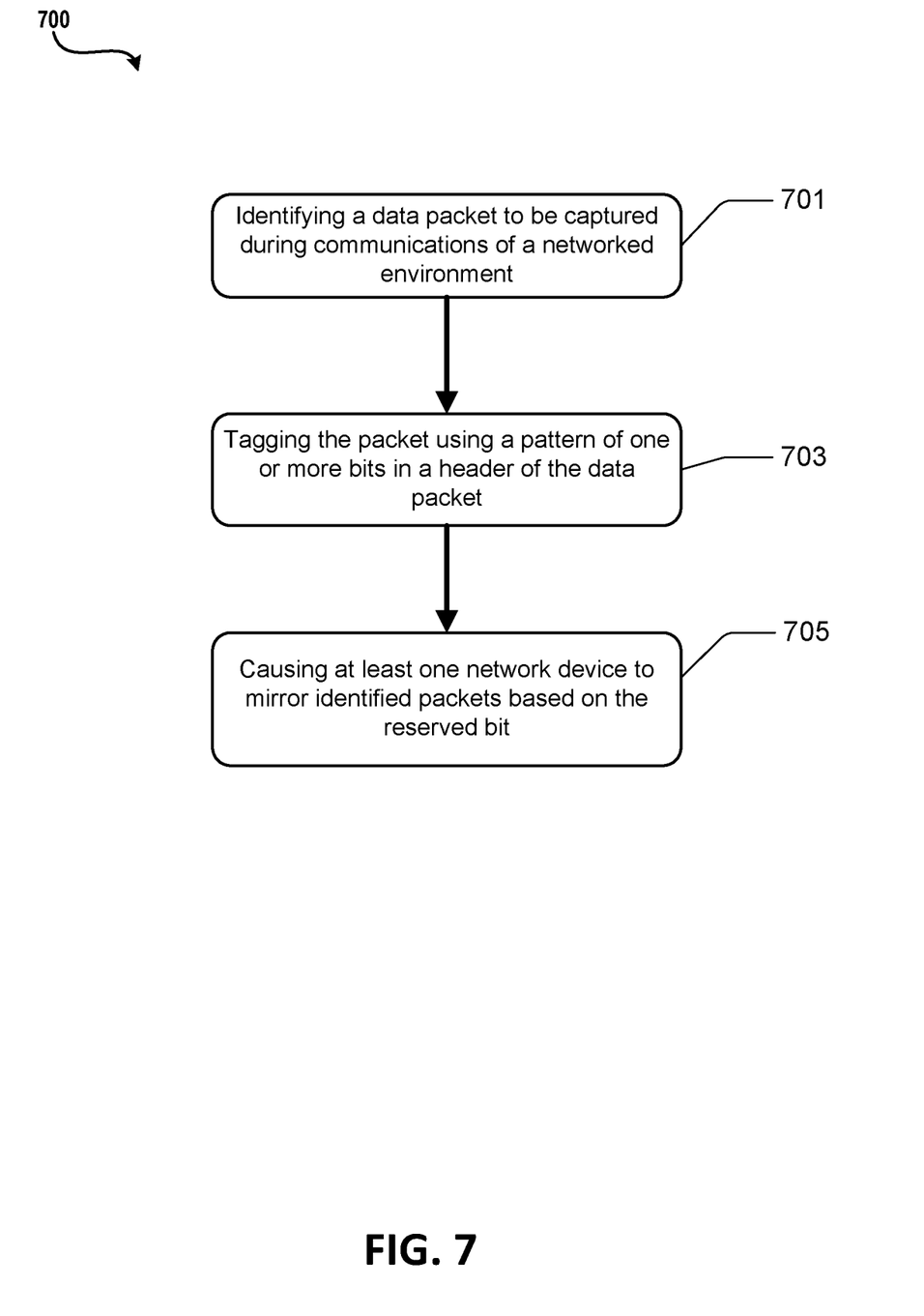
FIG. 7 is a flowchart depicting an example procedure for diagnosing network issues in accordance with the present disclosure.

In some embodiments, an API is instantiated that may be configured to specify packet capture on a per user basis or per flow level basis. In some embodiments, a packet counter may be implemented configured based on incoming and outgoing tagged packets. Additionally, a collector function may be configured to collect mirrored packets and counters Referring to FIG. 7, illustrated is another example operational procedure for capturing network traffic in a networked environment. Such an operational procedure may provide for capturing network traffic and can be provided by services such as the controller 320 and host component 337 in FIG. 3. The operational procedure may be implemented in a system comprising one or more computing devices. Referring to FIG. 7, operation 701 illustrates identifying a data packet to be captured during communications of a networked environment.

Operation 701 may be followed by operation 703. Operation 703 illustrates tagging the packet using a pattern of one or more bits in a header of the data packet. In an embodiment, the pattern of one or more bits are indicative that the data packet is to be captured. In an embodiment, the pattern is maintained in outer headers of any encapsulated packets that include the identified data packet.

Operation 703 may be followed by operation 705. Operation 705 illustrates causing at least one network device to mirror identified packets based on detecting the pattern in the header of the data packet or the outer header of the encapsulated packets. In an embodiment, the network device may be a switch configured to filter packets based on the pattern.

Example Clauses

The disclosure presented herein may be considered in view of the following clauses.

Example Clause A, method for capturing network traffic in a virtualized computing environment comprising at one or more computing devices and one or more network devices, the method comprising:
 determining a packet to be captured in the virtualized environment;
 tagging the packet using a pattern of one or more bits in a header of the packet, wherein the pattern indicates that the packet is to be traced;
 propagating the pattern to an outer layer during encapsulation of the packet, wherein a header of the encapsulated packet includes the pattern of one or more bits; and
 causing at least one network device to trace identified packets based on the pattern in the header of the encapsulated packet.

Example Clause B, the method of Example Clause A, wherein the packet to be captured is specified using an associated 5-tuple.

Example Clause C, the method of any one of Example Clauses A through B, wherein the packet to be captured is specified using an associated 5-tuple and a user or customer identifier.

Example Clause D, the method of any one of Example Clauses A through C, wherein the packet to be captured is based on a source virtual machine.

Example Clause E, the method of any one of Example Clauses A through D, wherein the packet to be captured is translated to a packet with one or more additional or removed headers.

Example Clause F, wherein markings that indicate that the packet is to be mirrored are propagated to the outer header.

Example Clause G, the method of any one of Example Clauses A through F, wherein the pattern of bits comprises a bit in a DSCP header.

Example Clause H, the method of any one of Example Clauses A through G, wherein the pattern of bits comprises a bit in a IP identifier field.

Example Clause I, the method of any one of Example Clauses A through H, wherein the reserved bit is the second most significant bit in the DSCP header.

Example Clause J, the method of any one of Example Clauses A through I, further comprising implementing a packet counter configured based on incoming and outgoing tagged packets.

Example Clause K, the method of any one of Example Clauses A through J, wherein packets are tagged at end hosts and entry points at an edge of a virtualized network.

Example Clause L, a system, comprising:
 one or more processors; and
 a memory in communication with the one or more processors, the memory having computer-readable instructions stored thereupon that, when executed by the one or more processors, cause the system to perform operations comprising:
 identifying a data packet to be captured during communications of a networked environment;
 tagging the packet using a pattern of one or more bits in a header of the data packet, wherein the pattern of one or more bits are indicative that the data packet is to be captured and wherein the pattern is maintained in outer headers of any encapsulated packets that include the identified data packet; and
 causing at least one network device to mirror identified packets based on detecting the pattern in the header of the data packet or the outer header of the encapsulated packets.

Example Clause M, the system of Example Clause L, further comprising propagating the pattern to an outer layer during encapsulation of the packet.

Example Clause N, the system of any one of Example Clauses L through M, further comprising implementing a collector function configured to collect mirrored packets and counters.

Example Clause O, the system of any one of Example Clauses L through N, wherein the packet to be captured is specified using an associated 5-tuple.

Example Clause P, the system of any one of Example Clauses L through O, wherein the at least one network device is a switch configured to filter packets based on the reserved pattern.

Example Clause Q, the system of any one of Example Clauses L through P, wherein an API is instantiated that is configured to specify packet capture on a per user basis or per flow level basis.

Example Clause R, a computer-readable storage medium having computer-executable instructions stored thereupon which, when executed by one or more processors of a computing device, cause the computing device to:
 determine a packet to be captured in the virtualized environment;
 tag the packet using a pattern of one or more bits in a header of the packet, wherein the pattern indicates that the packet is to be traced;
 propagate the pattern to an outer layer during encapsulation of the packet, wherein a header of the encapsulated packet includes the pattern of one or more bits; and
 cause at least one network device to trace identified packets based on the pattern in the header of the encapsulated packet.

Example Clause S, the computer-readable storage medium of Example Clause R, wherein the pattern of bits comprises a bit in a IP identifier field.

Example Clause T, the computer-readable storage medium of any one of Example Clauses R through S, wherein the reserved bit is a bit in a DSCP header.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems. The embodiments described herein may also be practiced in distributed computing environments, where tasks are performed by remote processing devices that are linked through a communications network. In a distributed computing environment, program modules may be located in both local and remote memory storage devices.

Networks established by or on behalf of a user to provide one or more services (such as various types of cloud-based computing or storage) accessible via the Internet and/or other networks to a distributed set of clients may be referred to as a service provider. Such a network may include one or more data centers such as data center 100 illustrated in FIG. 1, which are configured to host physical and/or virtualized computer servers, storage devices, networking equipment and the like, that may be used to implement and distribute the infrastructure and services offered by the service provider.

Figure 8:
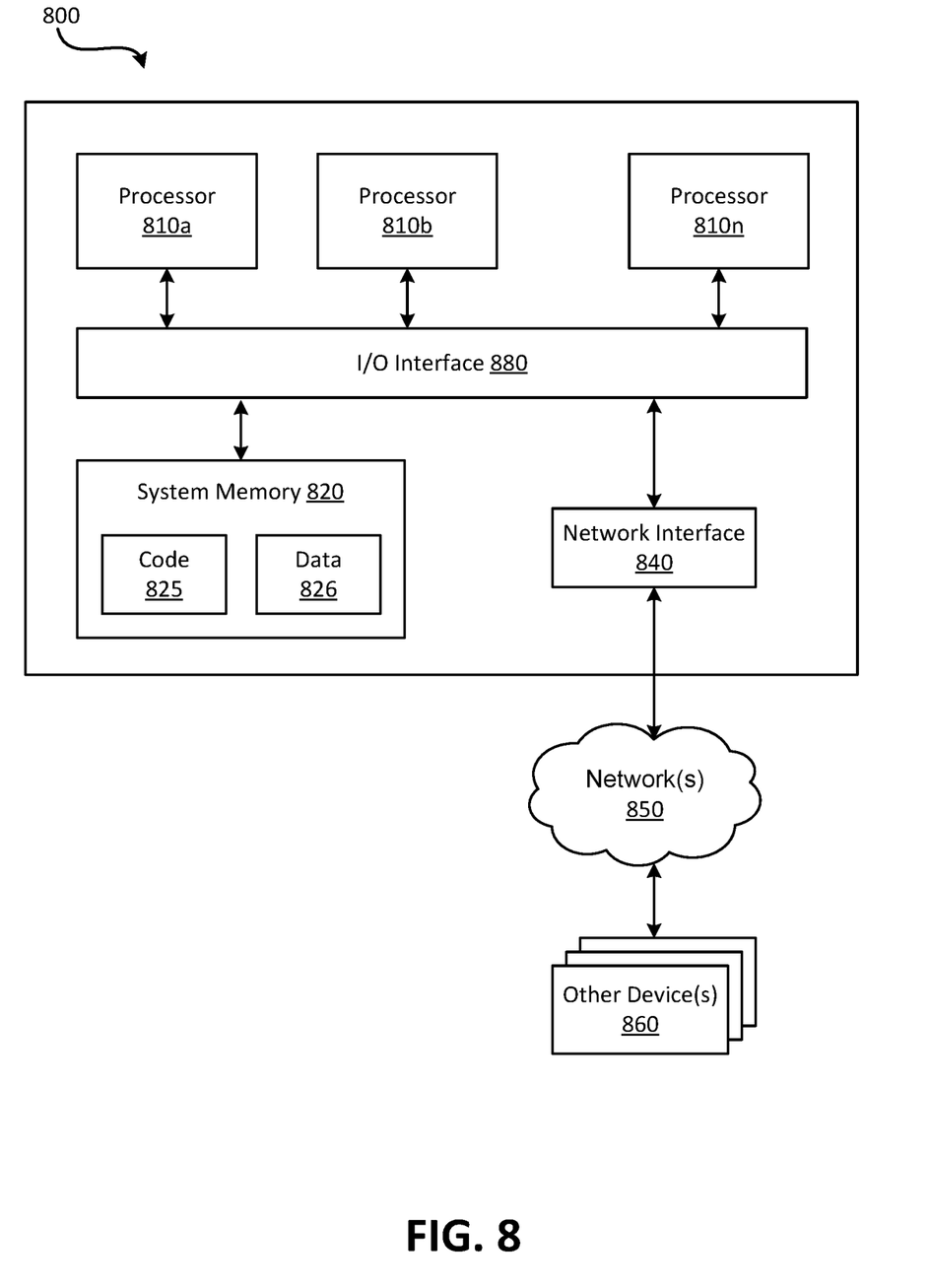
FIG. 8 is an example computing device in accordance with the present disclosure.

In some embodiments, a server that implements a portion or all of one or more of the technologies described herein, including the techniques to implement the capturing of network traffic may include a general-purpose computer system that includes or is configured to access one or more computer-accessible media. FIG. 8 illustrates such a general-purpose computing device 800. In the illustrated embodiment, computing device 800 includes one or more processors 810a, 810b, and/or 810n (which may be referred herein singularly as "a processor 810" or in the plural as "the processors 810") coupled to a system memory 820 via an input/output (I/O) interface 830. Computing device 800 further includes a network interface 840 coupled to I/O interface 830.

In various embodiments, computing device 800 may be a uniprocessor system including one processor 810 or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor(s) 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 820 as code 825 and data 826.

In one embodiment, I/O interface 830 may be configured to coordinate I/O traffic between the processor 810, system memory 820, and any peripheral devices in the device, including network interface 840 or other peripheral interfaces. In some embodiments, I/O interface 830 may perform any necessary protocol, timing, or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components. Also, in some embodiments some or all of the functionality of I/O interface 830, such as an interface to system memory 820, may be incorporated directly into processor 810.

Network interface 840 may be configured to allow data to be exchanged between computing device 800 and other device or devices 860 attached to a network or network(s) 850, such as other computer systems or devices as illustrated in FIGS. 1 through 4, for example. In various embodiments, network interface 840 may support communication via any suitable wired or wireless general data networks, such as types of Ethernet networks, for example. Additionally, network interface 840 may support communication via telecommunications/telephony networks such as analog voice networks or digital fiber communications networks, via storage area networks such as Fibre Channel SANs or via any other suitable type of network and/or protocol.

In some embodiments, system memory 820 may be one embodiment of a computer-accessible medium configured to store program instructions and data as described above for FIGS. 1-7 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 800 via I/O interface 830. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 800 as system memory 820 or another type of memory. Further, a computer-accessible medium may include transmission media or signals such as electrical, electromagnetic or digital signals, conveyed via a communication medium such as a network and/or a wireless link, such as may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 8, may include other components that are not explicitly shown in FIG. 8, or may utilize an architecture completely different than that shown in FIG. 8.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method for capturing network traffic in a virtualized computing environment comprising at least one or more computing devices and one or more network devices, the virtualized computing environment configured to implement one or more virtual networks associated with a user of the virtualized computing environment, the one or more virtual networks implemented with one or more virtual machines, the method comprising:

receiving a request to track data packets associated with a specified flow of the virtualized computing environment or the one or more virtual networks of the virtualized computing environment, the request comprising a specified state for data packets to be tracked;

in response to the request, generating rules for hosts that are hosting virtual machines associated with the request, the rules usable to enable identification and tagging of the data packets associated with the request;

based on the rules, tagging, by hosts that are hosting virtual machines associated with the request, packets identified by the rules using a pattern of one or more bits in a reserved field of a header of the packet, wherein the pattern indicates that the packet is to be tracked;

propagating the pattern to an outer layer during encapsulation of the packet, wherein a header of the encapsulated packet includes the pattern of one or more bits;

causing the network devices, virtual network functions, and end hosts of the virtualized computing environment to track identified packets based on the pattern in the header of the encapsulated packet; and collecting tagged packets and a number of tracked packets for network traffic analysis of the virtualized computing environment.

2. The method of claim 1, wherein the packet to be tracked is specified using an associated 5-tuple.

3. The method of claim 1, wherein the packet to be tracked is specified using an associated 5-tuple and a user or customer identifier.

4. The method of claim 1, wherein the packet to be tracked is based on a source virtual machine.

5. The method of claim 1, wherein the packet to be tracked is translated to a packet with one or more additional or removed headers.

6. The method of claim 1, wherein markings that indicate that the packet is to be mirrored are propagated to an outer header.

7. The method of claim 1, wherein the pattern of one or more bits comprises a bit in a Differentiated Services Code Point (DSCP) header.

8. The method of claim 7, wherein the bit is a second most significant bit in the DSCP header.

9. The method of claim 1, wherein the pattern of one or more bits comprises a bit in an Internet Protocol (IP) identifier field.

10. The method of claim 1, further comprising implementing a packet counter configured based on incoming and outgoing tagged packets.

11. The method of claim 1, wherein packets are tagged at end hosts and entry points at an edge of the virtualized computing environment.

12. A non-transitory computer-readable storage medium having computer-executable instructions stored thereupon which, when executed by one or more processors of a computing device, cause the computing device to:

determine a packet to be captured in a virtualized computing environment comprising at least one or more computing devices and one or more network devices, the virtualized computing environment configured to implement one or more virtual networks associated with a user of the virtualized computing environment, the one or more virtual networks implemented with one or more virtual machines;

receive a request to track data packets associated with a specified flow of the virtualized computing environment or the one or more virtual networks of the virtualized computing environment, the request comprising a specified state for data packets to be tracked;

in response to the request, generate rules for hosts that are hosting virtual machines associated with the request, the rules usable to enable identification and tagging of the data packets associated with the request;

based on the rules, tag, by hosts that are hosting virtual machines associated with the request, packets identified by the rules using a pattern of one or more bits in a reserved field of a header of the packet, wherein the pattern indicates that the packet is to be tracked;

propagate the pattern to an outer layer during encapsulation of the packet, wherein a header of the encapsulated packet includes the pattern of one or more bits; and cause the network devices, virtual network functions, and end hosts of the virtualized computing environment to track identified packets based on the pattern in the header of the encapsulated packet.

13. The non-transitory computer-readable storage medium of claim 12, wherein the pattern of one or more bits comprises a bit in an Internet Protocol (IP) identifier field.

14. The non-transitory computer-readable storage medium of claim 12, wherein the pattern is a bit in a Differentiated Services Code Point (DSCP) header.

15. A system, comprising:
one or more processors; and
a memory in communication with the one or more processors, the memory having computer-readable instructions stored thereupon that, when executed by the one or more processors, cause the system to perform operations comprising:

receiving a request to track data packets associated with a specified flow of a virtualized computing environment or a virtual network of the virtualized computing environment, the virtualized computing environment comprising at least one or more computing devices and one or more network devices, the request comprising a specified state for data packets to be tracked;

in response to the request, generating rules for hosts that are hosting virtual machines associated with the request, the rules usable to enable identification and tagging of the data packets associated with the request;

based on the rules, tagging, by hosts that are hosting virtual machines associated with the request, packets identified by the rules using a pattern of one or more bits in a reserved field of a header of the packet, wherein the pattern indicates that the packet is to be tracked;

propagating the pattern to an outer layer during encapsulation of the packet, wherein a header of the encapsulated packet includes the pattern of one or more bits;

causing the network devices, virtual network functions, and end hosts of the virtualized computing environment to track identified packets based on the pattern in the header of the encapsulated packet; and collecting tagged packets and a number of tracked packets for network traffic analysis of the virtualized computing environment.

16. The system of claim 15, wherein the packet to be tracked is specified using an associated 5-tuple and a user or customer identifier.

17. The system of claim 15, wherein the packet to be tracked is based on a source virtual machine.

18. The system of claim 15, wherein the packet to be tracked is translated to a packet with one or more additional or removed headers.

19. The system of claim 15, wherein the pattern of one or more bits comprises a bit in a DSCP header or IP identifier field.

20. The system of claim 15, wherein packets are tagged at end hosts and entry points at an edge of the virtualized network.

* * * * *